United States Patent
Hyodo et al.

(10) Patent No.: US 11,064,125 B2
(45) Date of Patent: Jul. 13, 2021

(54) IMAGE PICKUP APPARATUS

(71) Applicant: CANON KABUSHIKI KAISHA, Tokyo (JP)

(72) Inventors: Yoshimasa Hyodo, Tokyo (JP); Ayumu Nemoto, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/882,727

(22) Filed: May 25, 2020

(65) Prior Publication Data

US 2020/0382713 A1    Dec. 3, 2020

(30) Foreign Application Priority Data

May 29, 2019   (JP) .............................. JP2019-100462

(51) Int. Cl.
*H04N 5/232*    (2006.01)
*H04N 5/225*    (2006.01)

(52) U.S. Cl.
CPC ....... *H04N 5/23299* (2018.08); *H04N 5/2252* (2013.01); *H04N 5/2253* (2013.01)

(58) Field of Classification Search
CPC ...... G02B 7/04; G02B 27/144; G02B 27/143; G03B 5/00; G03B 3/10; G03B 2205/0061; G03B 2205/0046; G03B 17/561; H02N 2/108; H02N 2/103; H02N 2/0015; H04N 5/23299; H04N 5/2252; H04N 5/2253; H04N 5/23203
USPC ........................................................ 348/373
See application file for complete search history.

(56) References Cited

U.S. PATENT DOCUMENTS

| | | | | |
|---|---|---|---|---|
| 5,678,099 A * | 10/1997 | Kato | ...................... | G03B 29/00 396/427 |
| 6,734,914 B1 * | 5/2004 | Nishimura | ........... | H04N 13/239 348/375 |
| 7,209,164 B2 * | 4/2007 | Nishimura | ........... | H04N 13/239 348/207.99 |
| 7,832,947 B2 * | 11/2010 | Takahashi | .............. | H02N 2/108 396/428 |
| 8,110,967 B2 * | 2/2012 | Ting | ...................... | H02N 2/108 310/371 |
| 8,285,416 B2 * | 10/2012 | Cho | ................... | H04N 5/23258 700/245 |
| 8,841,868 B2 * | 9/2014 | Toyama | .................. | H02N 2/14 318/114 |

(Continued)

FOREIGN PATENT DOCUMENTS

JP    2010-124603 A    6/2010

*Primary Examiner* — Pritham D Prabhakher
(74) *Attorney, Agent, or Firm* — Cowan, Liebowitz & Latman, P.C.

(57) ABSTRACT

An image pickup apparatus includes a movable unit that includes an image pickup unit having a lens and an image sensor, and a driver configured to drive the movable unit so as to change a direction of the movable unit. The driver is a vibrator whose vibration is excited by a piezoelectric element. At least part of an outer surface of the movable unit is a spherical surface, and the spherical surface includes a contact surface which the vibrator contacts. The contact surface is continuously provided in at least one section passing through a spherical center of the spherical surface in an area of a central angle of 180° or wider around the spherical center on the spherical surface.

8 Claims, 8 Drawing Sheets

(56) References Cited

U.S. PATENT DOCUMENTS

| | | | |
|---|---|---|---|
| 9,386,226 B2* | 7/2016 | Takizawa | H04N 5/2254 |
| 9,952,019 B2* | 4/2018 | Burkland | F41G 7/2213 |
| 2004/0190863 A1* | 9/2004 | Nishimura | H04N 5/23299 |
| | | | 348/373 |
| 2008/0238249 A1* | 10/2008 | Takahashi | H02N 2/108 |
| | | | 310/317 |
| 2010/0207488 A1* | 8/2010 | Ting | H02N 2/16 |
| | | | 310/323.06 |
| 2011/0119684 A1* | 5/2011 | Suggs | G06F 9/45512 |
| | | | 719/313 |
| 2013/0294760 A1* | 11/2013 | Honsho | H04N 5/2251 |
| | | | 396/535 |
| 2014/0049824 A1* | 2/2014 | Katsuyama | G03B 17/02 |
| | | | 359/509 |
| 2014/0362242 A1* | 12/2014 | Takizawa | H04N 5/2254 |
| | | | 348/208.11 |
| 2016/0088227 A1* | 3/2016 | Ito | H02N 2/0055 |
| | | | 348/357 |
| 2018/0159447 A1* | 6/2018 | Sumioka | H01L 41/042 |
| 2019/0113922 A1* | 4/2019 | Koyama | F16M 11/2014 |
| 2019/0199907 A1* | 6/2019 | Daulton | H04N 5/23216 |

* cited by examiner

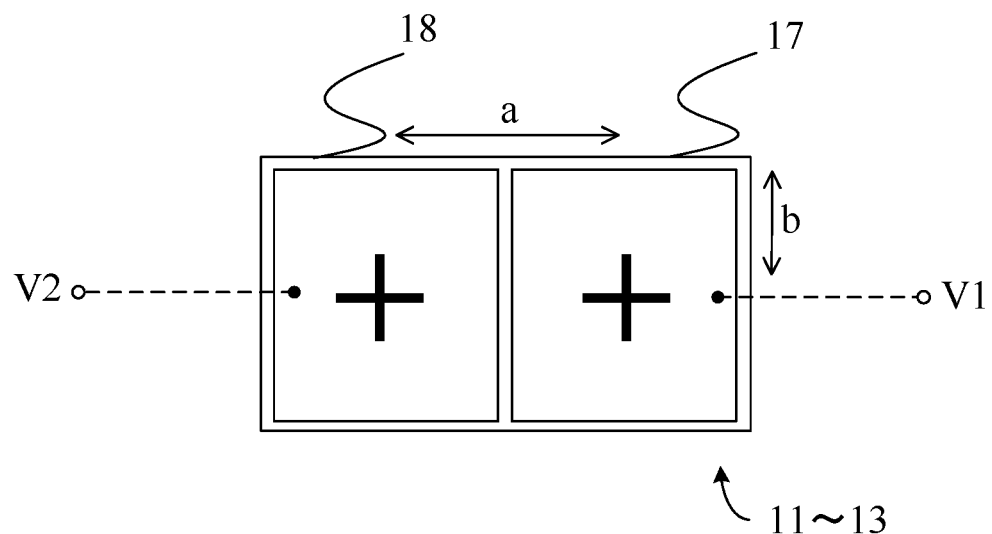
FIG. 3A
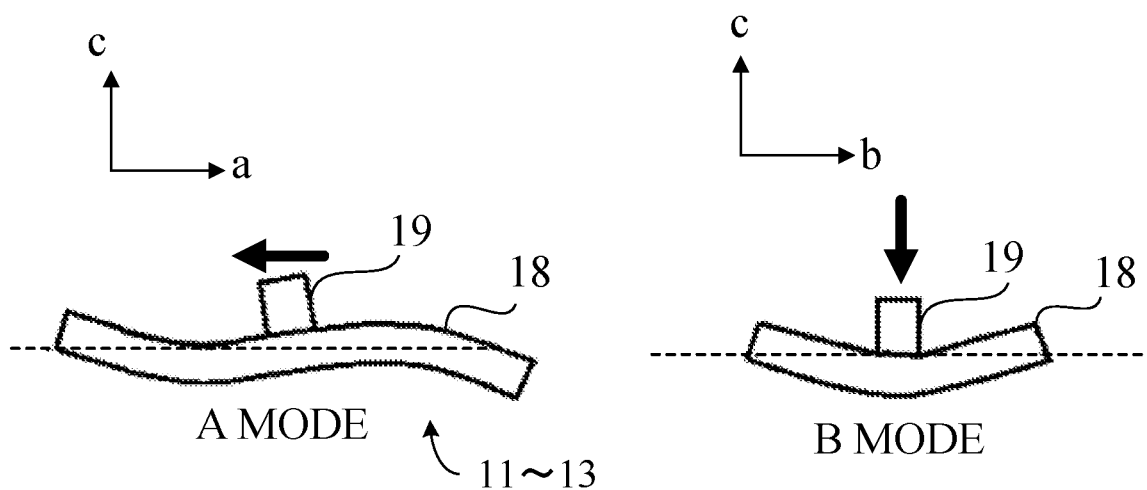
FIG. 3B
FIG. 3C

IMAGE PICKUP APPARATUS

BACKGROUND OF THE INVENTION

Field of the Invention

The present invention relates to an image pickup apparatus having a movable unit that can change an image pickup direction.

Description of the Related Art

As disclosed in Japanese Patent Laid-Open No. ("JP") 2010-124603, some of the above image pickup apparatuses apply the voltage to a piezoelectric element, vibrate a vibrator, rotate a spherical movable unit that compressively contacts the vibrator, and thereby change a direction of an image pickup system held by the spherical movable unit or the image pickup direction.

This image pickup apparatus may maintain as wide as possible an imageable range (image pickup range), and thus make the rotatable range (movable range) of the spherical movable unit as wide as possible.

SUMMARY OF THE INVENTION

The present invention provides an image pickup apparatus that can make wide a movable range of a spherical movable unit to increase an image pickup range.

An image pickup apparatus according to one aspect of the present invention includes a movable unit that includes an image pickup unit having a lens and an image sensor, and a driver configured to drive the movable unit so as to change a direction of the movable unit. The driver is a vibrator whose vibration is excited by a piezoelectric element. At least part of an outer surface of the movable unit is a spherical surface, and the spherical surface includes a contact surface which the vibrator contacts. The contact surface is continuously provided in at least one section passing through a spherical center of the spherical surface in an area of a central angle of 180° or wider around the spherical center on the spherical surface.

Further features of the present invention will become apparent from the following description of exemplary embodiments with reference to the attached drawings.

BRIEF DESCRIPTION OF THE DRAWINGS

FIGS. 3A to 3C illustrate a vibration-type actuator used for the image pickup apparatus according to the embodiment.

DESCRIPTION OF THE EMBODIMENTS

Figure 1:
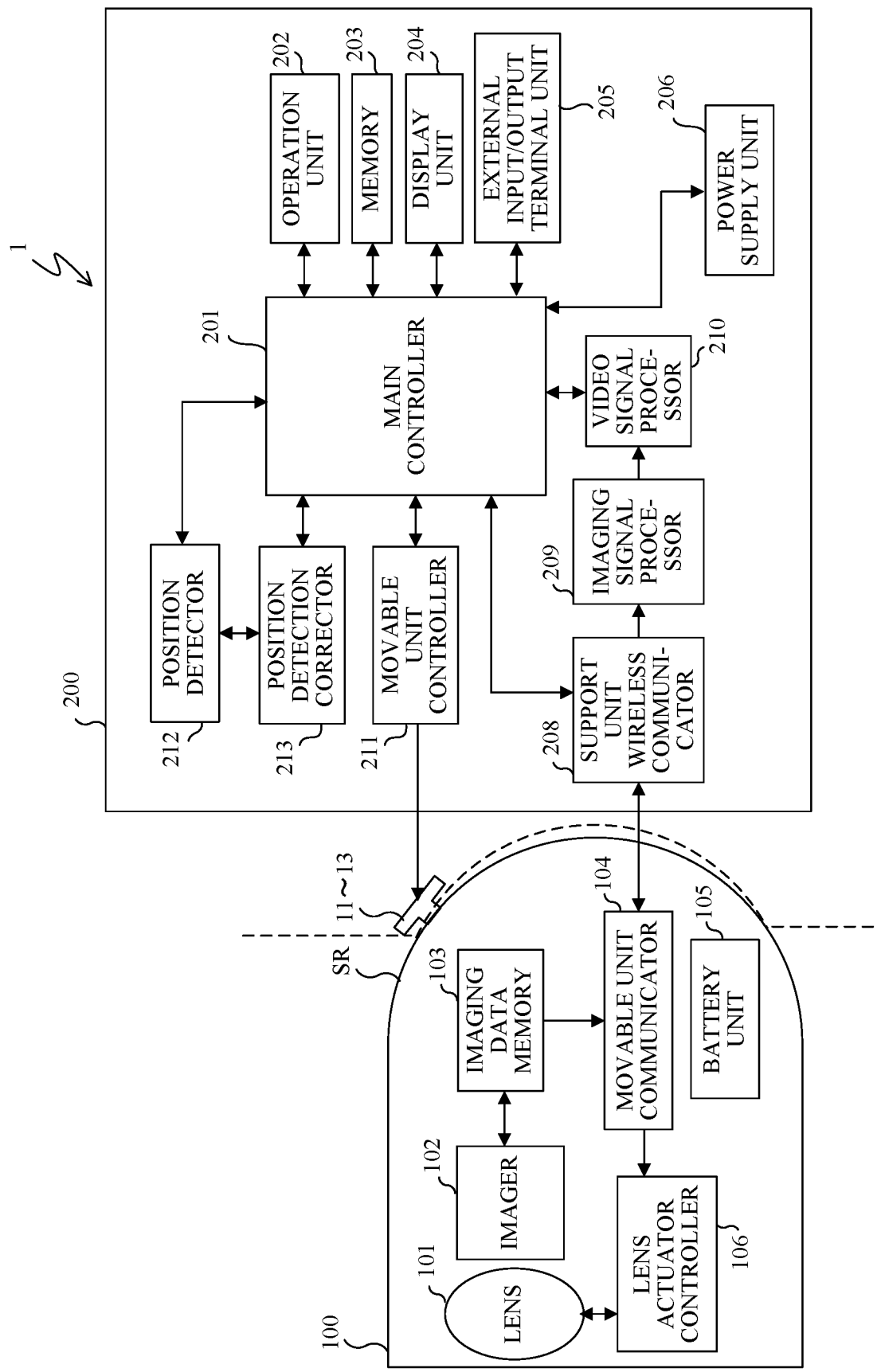
FIG. 1 is a block diagram illustrating a configuration of an image pickup apparatus according to one embodiment of the present invention.

Referring now to the accompanying drawings, a detailed description will be given of embodiments according to the present invention. FIG. 1 illustrates an internal configuration of an image pickup apparatus 1 according to one embodiment of the present invention. Reference numeral 100 denotes a spherical movable unit (simply referred to as a movable unit hereinafter) as a moving body, and reference numeral 200 denotes a support unit that rotatably supports the movable unit 100. At least part of the outer surface of the movable unit 100 has a spherical surface SR. The support unit 200 has a plurality of vibrators (vibration-type actuators) 11 to 13 including a piezoelectric element (17 in FIG. 3A) that compressively contact the spherical surface SR of the movable unit 100. The support unit 200 has a main controller 201 that controls the rotational position of the movable unit 100 by driving the vibrators 11 to 13 to generate vibrations and controls the entire image pickup apparatus 1.

The movable unit 100 has an image pickup system including a lens unit 101 and an imager 102. The lens unit 101 is an image pickup optical system that includes a zoom unit, a diaphragm (aperture stop)/shutter unit, a focus unit, and the like. The imager 102 includes an image sensor such as a CMOS sensor and a CCD sensor. The image sensor photoelectrically converts an optical image (object image) formed by the lens unit 101 and outputs an electric signal (imaging data). The imager 102 further includes an imaging control processing circuit that controls the image sensor and processes the imaging data.

An imaging data memory 103 stores the imaging data output from the imager 102, and transfers the stored imaging data to a movable unit wireless communicator 104 as a communicator. The movable unit wireless communicator 104 includes a transmission/reception antenna, and performs wireless data communications between the movable unit 100 and the support unit 200. The imaging data output from the imager 102 and stored in the imaging data memory 103 is transmitted to the support unit 200 in chronological order.

A lens actuator controller 106 includes a motor driver IC, and drives actuators in the zoom unit, the diaphragm/shutter unit, the focus unit, and the like of the lens unit 101. Each actuator is driven according to an actuator driving instruction signal of the lens unit 101 received from the support unit 200 via the movable unit communicator 104. A battery unit 105 supplies the power to each component in the movable unit 100.

In the support unit 200, the main controller 201 includes a microcomputer such as a CPU, and controls the entire image pickup apparatus 1. A support unit communicator 208 receives the imaging data obtained by the imager 102 from the movable unit 100 and transmits an actuator driving instruction signal to the movable unit 100 by the wireless communications. An imaging signal processor 209 converts the imaging data received from the support unit communicator 208 into a video signal. A video signal processor 210 processes the video signal output from the imaging signal processor 209 according to the application. Processing of the video signal includes image cutting and rotation processing for the electronic image stabilization.

An operation unit 202 is provided for a user to give an instruction to the image pickup apparatus 1. A memory 203 stores the video signal and various data. A display unit 204 includes a display device such as an LCD, and displays an image according to the video signal output from the video signal processor 210. An external input/output terminal unit 205 inputs and outputs a communication signal and a video signal with an external device. A power supply unit 206 supplies the power to each component in the image pickup apparatus 1.

A position detector 212 includes a light source and an image sensor, and detects a rotation position of the movable unit 100. More specifically, the position detector 212 irradiates light from the light source onto the spherical surface SR of the movable unit 100, captures an image of the spherical surface SR through the image sensor, and then captures an image again the spherical surface SR through the image sensor after a predetermined time passes. The spherical surface SR has an index for detecting a relative position such as a mark and a pattern. The position detector 212 compares the image obtained by the first imaging with the image obtained by the subsequent imaging, and detects the moving direction and the moving amount of the index. Thereby, the rotational direction and the rotation amount of the movable unit 100 or the relative rotational position can be detected.

The spherical surface SR has an index for detecting an absolute position separately from the index for detecting a relative position. The position of the index for detecting the absolute position in the movable unit 100 is stored in the memory in advance, and the absolute rotation position of the unit 100 can be detected based on the moving direction and the moving amount of the index for detecting the relative position from the state where the index for detecting the absolute position is detected.

The main controller 201 controls rotations in multiple degrees of freedom of the movable unit 100 by controlling the driving of the plurality of vibrators 11 to 13 through the movable unit controller 211 while monitoring the rotational position from the position detector 212. The movable unit controller 211 drives the vibrator and generates the vibrations by applying the voltage to all or some of the piezoelectric elements among the vibrators 11 to 13.

When the image acquired by the image sensor of the position detector 212 includes the rotation position information (index for detecting the absolute position) of the movable unit 100, a position detection corrector 213 corrects an error between the absolute position obtained from the relative rotation position detection result and the actual absolute position is corrected.

Figure 2:
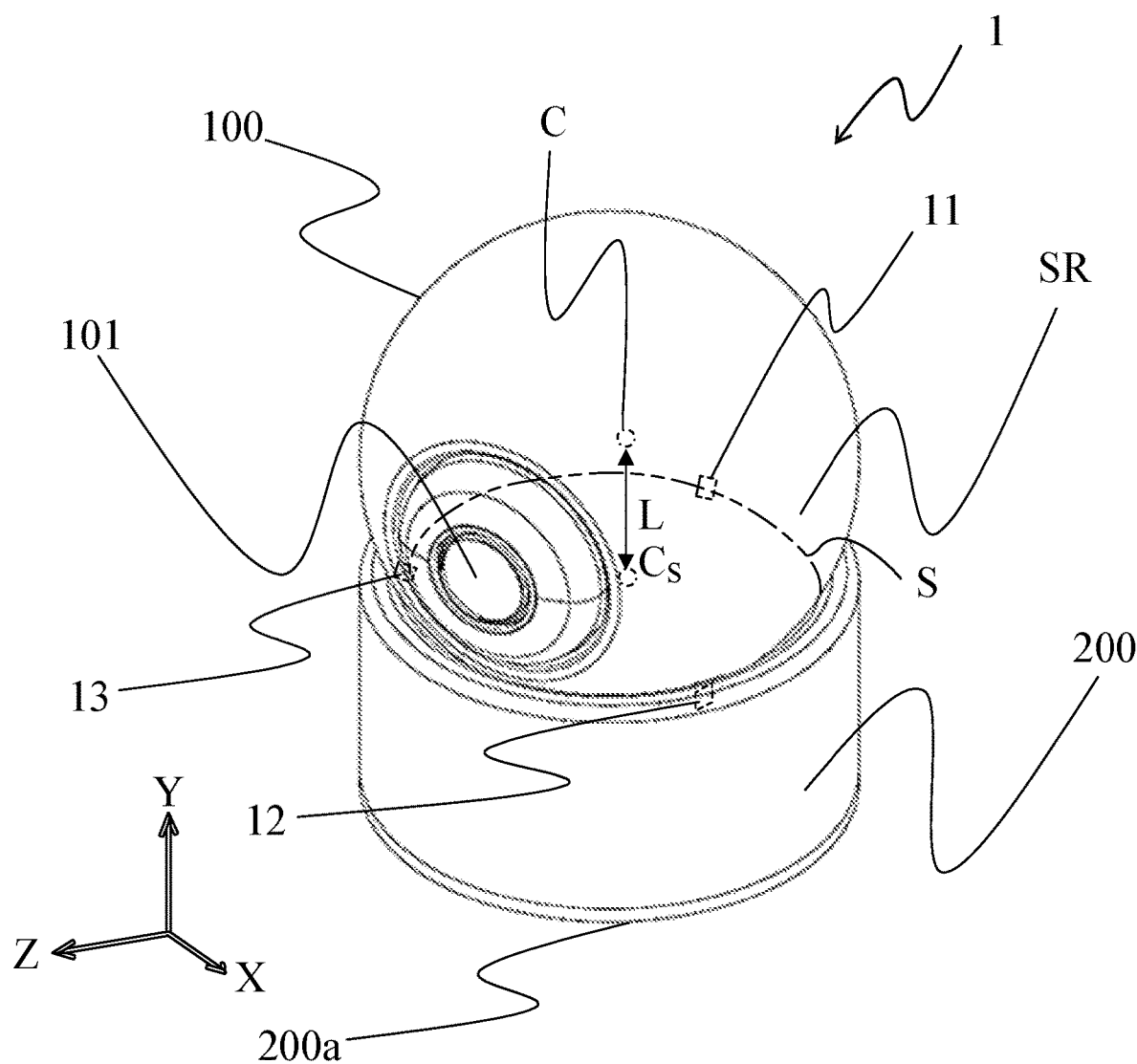
FIG. 2 is an external perspective view of the image pickup apparatus according to the embodiment.
Figure 4:
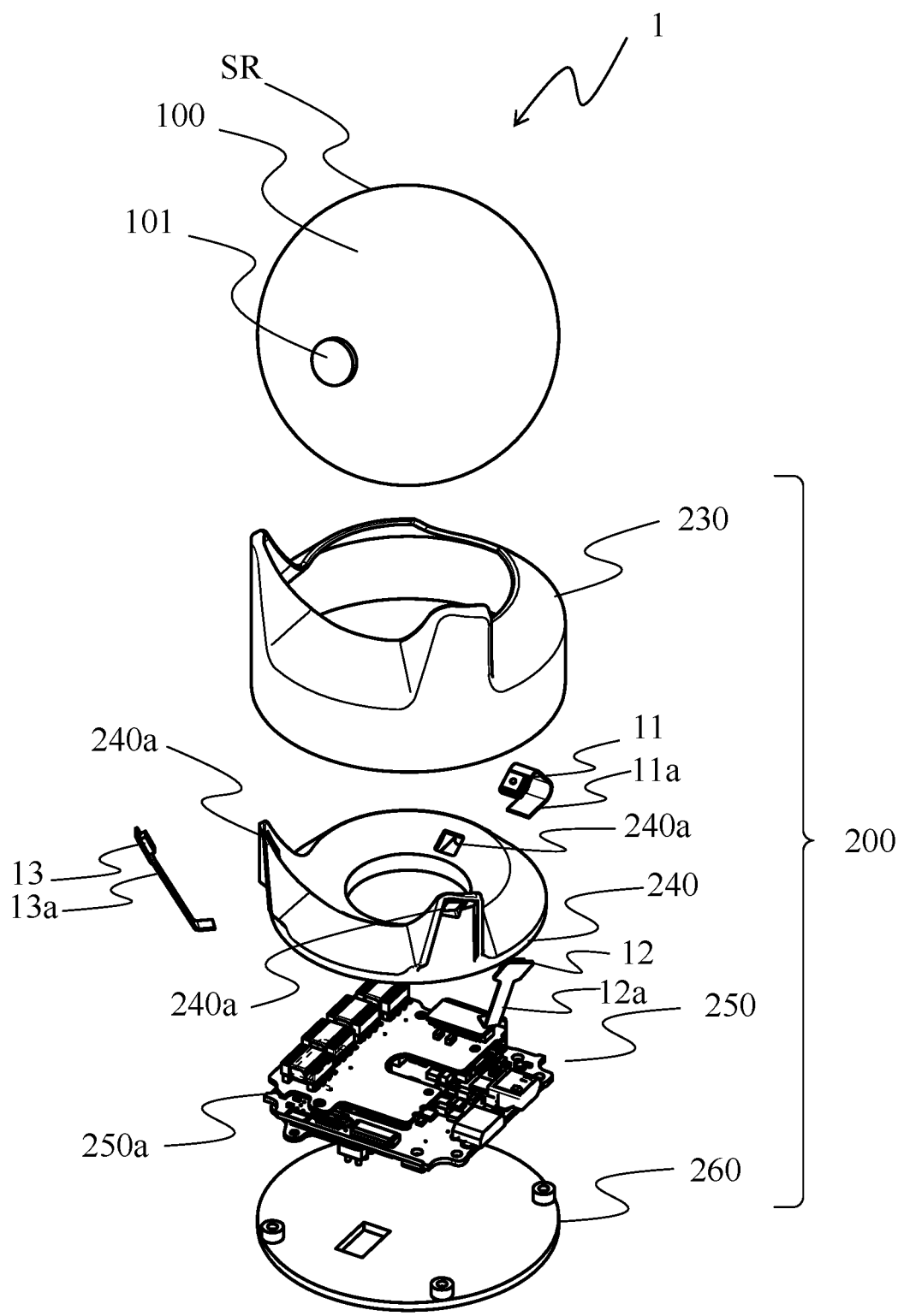
FIG. 4 is an exploded perspective view of the image pickup apparatus according to the embodiment.

Referring now to FIGS. 2 and 4, a description will be given of a specific configuration of the image pickup apparatus 1. FIG. 2 illustrates the appearance of the image pickup apparatus 1, and FIG. 4 is the exploded image pickup apparatus 1. The movable unit 100 has a sphere as a housing (exterior member) into which the lens unit 101, the imager 102, and the like are incorporated. The surface of the sphere is the above spherical surface SR. The movable unit 100 is mounted on a plurality of vibrators 11 to 13 provided on the support unit 200. In the following description, as illustrated in FIG. 2, a bottom surface 200*a* of the support unit 200 is a plane parallel to an XZ plane including an X axis and a Z axis orthogonal to each other, and an axis orthogonal to each of the X axis and the Z axis is set to a Y axis (axis in the height direction).

Each of the vibrators 11 to 13 is held by the support unit 200 via an unillustrated spring member so as to be biased against a spherical center C of the movable unit 100. In other words, each of the vibrators 11 to 13 is held by the support unit 200 while the vibrators 11 to 13 compressively contact the spherical surface SR as the contact surface of the movable unit 100. The spherical surface SR is formed as a surface of a material such as metal, which is less worn due to the frictional contact with the vibrator. This embodiment forms the spherical surface SR of metal.

When the movable unit controller 211 illustrated in FIG. 1 applies the voltage to the piezoelectric element in each vibrator, the vibration is excited in the vibrator, and the movable unit 100 is frictionally driven at a contact portion with the vibrator. The movable unit 100 rotates around the spherical center C by the resultant force of the driving forces applied to the movable unit 100 from the vibrators 11 to 13. Thereby, the image pickup direction which is the direction of the lens unit 101 can be freely selected.

Referring now to FIGS. 3A to 3C, a description will be given of the driving principle of the vibrators 11 to 13. Each vibrator includes a vibration plate 18 and a piezoelectric element 17 as an electromechanical energy conversion element attached to the back surface of the vibration plate 18. FIG. 3A illustrates an electrode area of the piezoelectric element 17 attached to the rear surface of the vibration plate 18. Herein, electrode areas 17-1 and 17-2 divided into two in the longitudinal direction ("a" direction) are formed. The polarization directions of the electrode areas 17-1 and 17-2 are the same direction ("+"). The AC voltage V1 is applied to the right electrode area 17-1 and the AC voltage V2 is applied to the left electrode area 17-2. The AC voltages V1 and V2 have frequencies near the resonance frequency of the vibration mode (A-mode) illustrated in FIG. 3B and have phases that shift from each other by 180°.

FIG. 3B illustrates a state where the right electrode area 17-1 of the piezoelectric element 17 shrinks and the left electrode area 17-2 expands. Due to the applications of the AC voltages V1 and V2, this state and a state where the right electrode area 17-1 expands and the left electrode area 17-2 shrinks alternately occur. As a result, the A-mode vibration is generated on the vibration plate 18. This A-mode is a vibration mode that is a secondary bending mode in the "a" direction, and has three nodes having small displacements in the "c" direction and two abdomens having large displacements in the "c" direction. When the vibration in such a vibration mode occurs, the tip of the protrusion 19 as a contact portion provided at the center of the vibration plate 18 is displaced in the lateral direction in FIG. 3B. In FIG. 3A, the protrusion 19 is located on the back side of the piezoelectric element 17.

On the other hand, if the AC voltages V1 and V2 are set to the AC voltages that have frequencies near the resonance frequency of the vibration mode (B-mode) illustrated in FIG. 3C and phases equal to each other, the state in which the entire piezoelectric element 17 (the electrode areas 17-1 and 17-2) extends and the state in which it shrinks alternately occur. As a result, the B-mode vibration is generated on the vibrating plate 18. The B-mode is a vibration mode that is a primary bending mode in the "b" direction, and has two nodes having small displacements in the "c" direction and one abdomen having a large displacement in the "c" direction. The resonance frequency of the A-mode and the resonance frequency of the B-mode are set to the same frequency (or have only a difference that can be regarded as the same).

By combining such vibrations at a certain temporal phase relationship, an elliptical motion having the "a" and "c" directions in the radial directions is generated at the tip of the protrusion 19 that contacts the movable unit 100. The movable unit 100 receives the frictional force from the protrusion 19 that elliptically moves as described above, and is driven in the thick arrow direction in FIG. 3B. Further, a generation ratio between the A-mode and the B-mode can be changed by changing the phase difference between the voltages applied to the electrode areas 17-1 and 17-2. The aspect ratio of the ellipse also changes according to the generation ratio of the A-mode and the B-mode. The rotational speed of the movable unit 100 can be controlled by changing the generation ratio between the A-mode and the B-mode in each of the vibrators 11 to 13 and by changing the driving force applied to the movable unit 100 by each of the vibrators 11 to 13.

In FIG. 4, the support unit 200 has a base cover 230, a chassis 240, an internal structure 250, and a bottom cover 260. The chassis 240 that holds the vibrators 11 to 13 is fixed onto the base cover 230. Each of the vibrators 11 to 13 is disposed so as to expose on the movable unit 100 side from the opening 240a provided in the chassis 240, and is attached to the chassis 240 via the unillustrated spring member so that a biasing force is applied to the spherical center C of the movable unit 100. Each of flexible printed circuit boards (FPC) 11a to 11c extending from the vibrators 11 to 13 is electrically connected to a control board 250a.

The control board 250a of the internal structure 250 includes the main controller 201, the memory 203, the movable unit controller 211, and the like illustrated in FIG. 1. The movable unit controller 211 applies the AC voltage to each of the piezoelectric elements 17 in the vibrators 11 to 13 via the FPCs 11a to 11c. The internal structure 250 is fixed inside the base cover 230 together with the chassis 240, and the casing is formed by fixing the bottom cover 260 below the base cover 230.

Figure 5A:
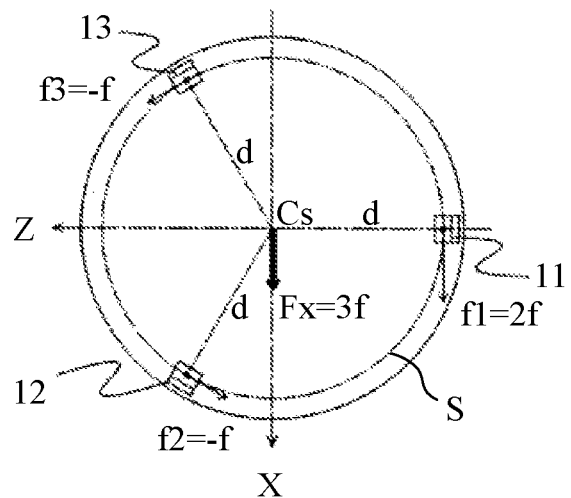
FIGS. 5A to 5C illustrate a relationship among a support unit, a movable unit, a vibrator, and a pressure receiver in the image pickup apparatus according to the embodiment.
Figure 5B:
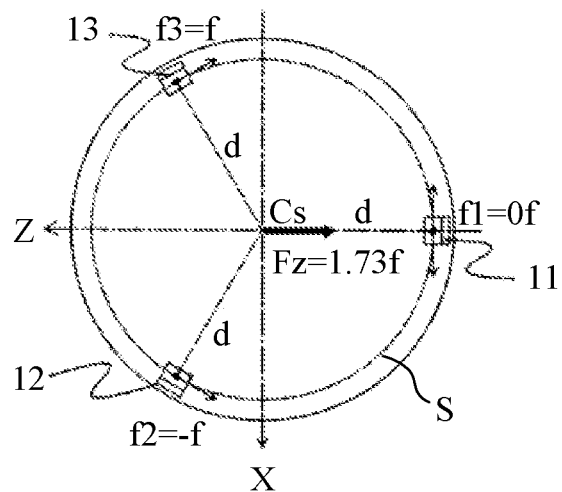
Figure 5C:
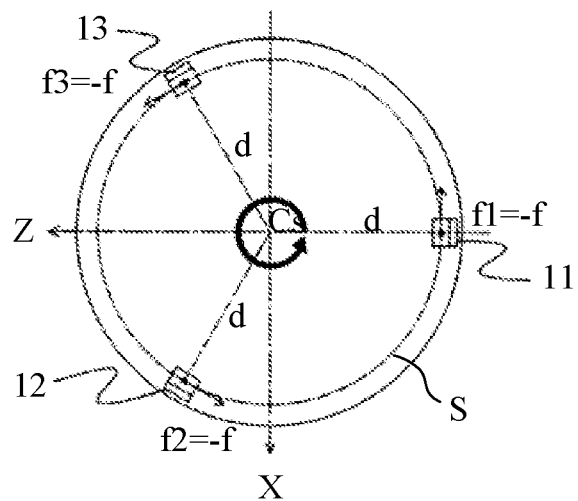

FIGS. 5A and 5C illustrate the movable unit 100 and the vibrators 11 to 13 viewed from the Y-axis direction. As illustrated in FIG. 2, the vibrators 11 to 13 are arranged on the circumference of an intersecting circle S at intervals of 120° between the spherical surface SR and a plane parallel to the XZ plane orthogonal to the Y axis and separated from the spherical center C of the movable unit 100 by a distance L. Assume Cs is the center of the intersecting circle S. This configuration can effectively maintain the state in which the vibrators 11 to 13 compressively contact the movable unit 100, and securely hold the movable unit 100 to prevent them from falling off.

Next follows a description of the drive controls over the vibrators 11 to 13 according to the rotational direction of the movable unit 100. FIG. 5A illustrates the drive controls over the vibrators 11 to 13 when the movable unit 100 is rotated around the Z axis. The three vibrators 11 to 13 are arranged at intervals of 120° on the circumference of the intersecting circle S at a distance d from the Y axis. When each of the vibrators 11 to 13 generates a positive clockwise driving force, the direction of the driving force generated by the vibrator 11 is a 0° direction relative to the X-axis direction, and the direction of the driving force generated by the vibrator 12 is the 240° direction, and the direction of the driving force generated by the vibrator 13 is the 120° direction. The three vibrators 11 to 13 contact the spherical surface SR of the movable unit 100 at three points at their protrusions (contact portions) 19. Thus, the protrusions 19 of the vibrators 11 to 13 can stably contact the spherical surface SR of the movable unit 100.

In FIG. 5A, assume that f1 is a driving force generated by the vibrator 11 for rotating the movable unit 100 around the Z axis, f2 is a driving force generated by the vibrator 12, f3 is a driving force generated by the vibrator 13, and f is a unit driving force. Then, the following relationship is established:

$$f1 = 2 \times f$$

$$f2 = -f$$

$$f3 = -f$$

Where Fx is a force in the X-axis direction, Fz is a force in the Y-axis direction, Fy is a force in the rotational direction, and d is a distance from the Y-axis to each of the vibrators 11 to 13, Fx, Fz, and Fx are expressed by the following expressions (1), (2), and (3), respectively.

$$Fx = f1 \times \cos(0\ \deg) + f2 \times \cos(240\ \deg) + F3 \times \cos(120\ \deg) = (2 \times f \times 1) + (-f \times -0.5) + (-f \times -0.5) = 3 \times f \quad (1)$$

$$Fz = f1 \times \sin(0\ \deg) + f2 \times \sin(240\ \deg) + f3 \times \sin(120\ \deg) = (2 \times f \times 0) + (-f \times -0.86) + (-f \times -0.86) = 0 \times f \quad (2)$$

$$Fy = f1 \times d + f2 \times d + f3 \times d = (2 \times f \times d) + (-f \times d) + (-f \times d) = 0 \times f \quad (3)$$

Thus, when f1 to f3 are generated in the vibrators 11 to 13, only the force Fx in the X-axis direction is generated as a resultant force at the center point Cs of the intersecting circle S. In other words, only the driving force in the X-axis direction is applied to the movable unit 100. Thus, the resultant force Fx of the driving forces generated by the vibrators 11 to 13 rotates the movable unit 100 around the Z axis.

FIG. 5B illustrates the drive controls over the vibrators 11 to 13 when the movable unit 100 is rotated around the X axis. Assume that f1 is a driving force generated by the vibrator 11 for rotating the movable unit 100 around the X axis, f2 is a driving force generated by the vibrator 12, f3 is a driving force generated by the vibrator 13, and f is a unit driving force. Then, the following relationship is established:

$$f1 = 0 \times f$$

$$f2 = -f$$

$$f3 = +f$$

Similar to rotating the movable unit 100 around the Z axis, the forces Fx, Fz, and Fy applied to the movable unit 100 are expressed by the following expressions (1a), (2a), and (3a), respectively:

$$Fx = f1 \times \cos(0\ \deg) + f2 \times \cos(240\ \deg) + f3 \times \cos(120\ \deg) = (0 \times f \times 1) + (-f \times -0.5) + (f \times -0.5) = 0 \times f \quad (1a)$$

$$Fz = f1 \times \sin(0\ \deg) + f2 \times \sin(240\ \deg) + f3 \times \sin(120\ \deg) = (0 \times f \times 0) + (-f \times -0.86) + (f \times 0.86) = 1.73 \times f \quad (2a)$$

$$Fy = f1 \times d + f2 \times d + f3 \times d = (0 \times f \times d) + (-f \times d) + (f \times d) = 0 \times f \quad (3a)$$

Thus, when f1 to f3 are generated in the vibrators 11 to 13, only the force Fz in the −Z-axis direction is generated as the resultant force at the center point Cs of the intersecting circle S. In other words, only the driving force in the −Z-axis direction is applied to the movable unit 100. Thus, the resultant force Fz of the driving forces generated by the vibrators 11 to 13 rotates the movable unit 100 around the X axis.

FIG. 5C illustrates the drive controls over the vibrators 11 to 13 when the movable unit 100 is rotated around the Y axis. Assume that f1 is a driving force generated by the vibrator 11 for rotating the movable unit 100 around the Y axis, f2 is a driving force generated by the vibrator 12, f3 is a driving force generated by the vibrator 13, and f is a unit driving force. Then, the following relationship is established:

$$f1=-f$$

$$f2=-f$$

$$f3=-f$$

The forces Fx, Fz, and Fy applied to the movable unit 100 are expressed by the following expressions (1b), (2b), and (3b), respectively:

$$Fx=f1\times\cos(0\deg)+f2\times\cos(240\deg)+f3\times\cos(120\deg)$$
$$=(-f\times1)+(-f\times-0.5)+(-f\times-0.5)=0\times f \quad (1b)$$

$$Fz=f1\times\sin(0\deg)+f2\times\sin(240\deg)+f3\times\sin(120\deg)=$$
$$(-f\times0)+(-f\times-0.86)+(-f\times0.86)=0\times f \quad (2b)$$

$$Fy=f1\times d+f2\times d+f3\times d=(-f\times d)+(-f\times d)+(-f\times d)=-3\times f \quad (3b)$$

Thus, when f1 to f3 are generated in the vibrators 11 to 13, only the force Fy in the Y-axis direction is generated as a resultant force at the center point Cs of the intersecting circle S. In other words, only the driving force in the Y-axis direction is applied to the movable unit 100. Thus, the resultant force Fy of the driving forces generated by the vibrators 11 to 13 rotates the movable unit 100 around the Y axis.

By combining these rotations, the movable unit 100 can be rotated around the spherical center C or around an arbitrary axis passing through the spherical center C, and the lens unit 101 can be directed in an arbitrary image pickup direction. This enables imaging in various directions.

Figure 6:
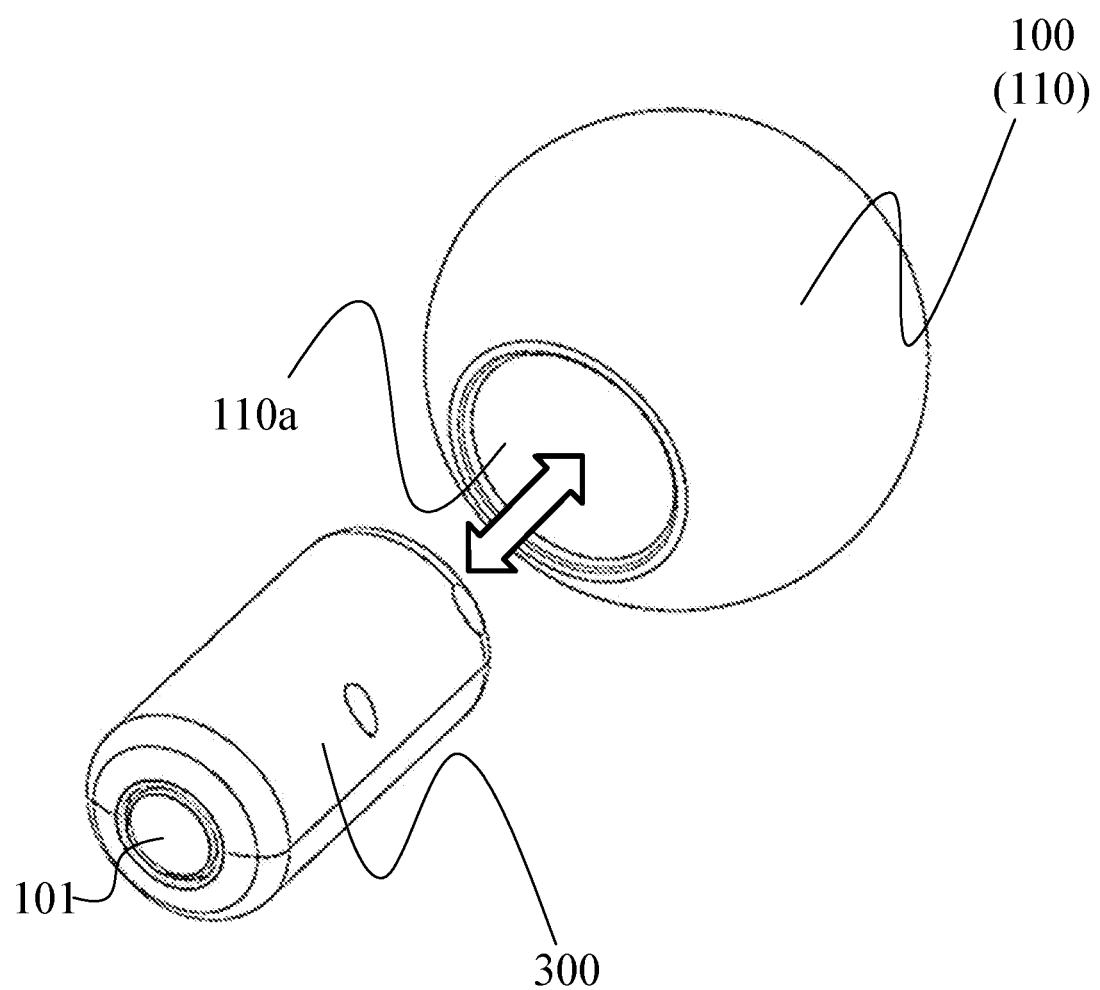
FIG. 6 illustrates an attachment and detachment of an image pickup unit to and from the movable unit in the image pickup apparatus according to the embodiment.
Figure 7C:
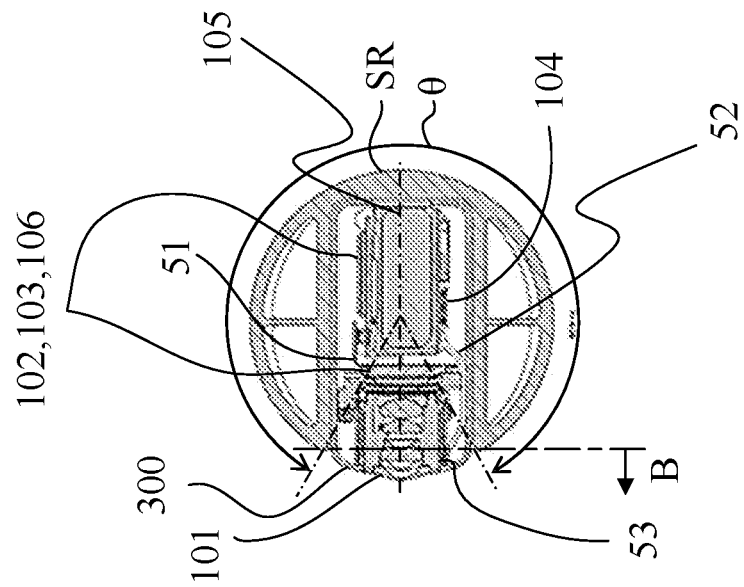
FIGS. 7A to 7C are a perspective view, a front view, and a sectional view of the movable unit in the image pickup apparatus according to the embodiment.
Figure 7B:
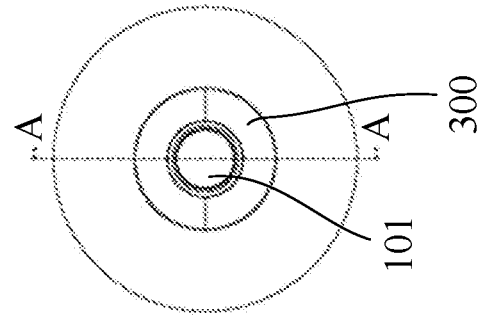
Figure 7A:
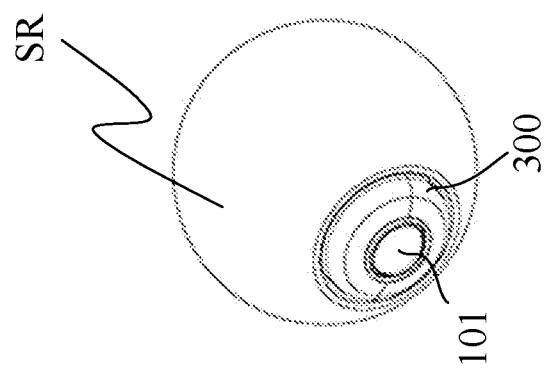

FIG. 6 illustrates an image pickup unit 300 that can be attached to and detached from the movable unit 100 (housing 110). FIGS. 7A and 7B illustrate the appearance of the movable unit 100 where the image pickup unit 300 mounted on the housing 110. FIG. 7C illustrates a section of the movable unit 100 along the line A-A in FIG. 7B. The image pickup unit 300 integrally accommodates the lens unit 101, the lens actuator controller 106, the imager 102, the imaging data memory 103, the movable unit wireless communicator 104, and the battery unit 105 illustrated in FIG. 1.

Figures 8A, 8B:
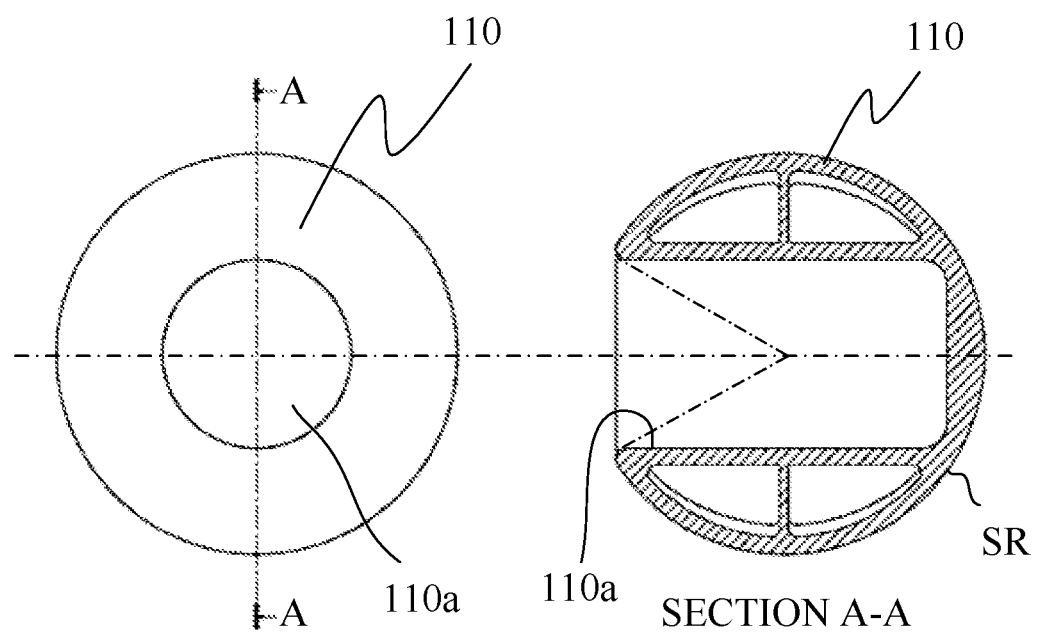
FIGS. 8A and 8B are an external view and a sectional view of a housing of the movable unit in the image pickup apparatus according to the embodiment.

In FIG. 7B, reference numeral 51 denotes an imaging flexible wiring board that forms a signal path (image pickup system signal path or channel) for imaging data from the image sensor to the imaging control processing circuit and the imaging data memory 103 in the imager 102. Reference numeral 52 denotes a communication flexible wiring board that forms a communication system signal path for connecting the movable unit wireless communicator 104 and the antenna 53 to each other. FIG. 8A illustrates the appearance of the housing 110, and FIG. 8B illustrates a section of the housing 110 taken along the line A-A in FIG. 8A. The housing 110 may be entirely made of metal (for example, produced by machining), or may be formed by forming a metal layer on the outer circumferential surface of a resin housing body by plating or the like. It may be manufactured by a 3D printer using a material containing metal powder.

The housing 110 has a bottomed hole 110a as a concave portion that opens in the surface of the housing 110. The image pickup unit 300 is inserted into the bottomed hole 110a from the side opposite to the lens unit 101, and is mounted on the housing 110. The insertion of the image pickup unit 300 into the bottomed hole 110a may be press-fitting to prevent the image pickup unit 300 from coming off when the movable unit 100 rotates. In addition, a lock mechanism for preventing or releasing the image pickup unit 300 from the housing 110 may be provided.

In the section of FIG. 7C, the surface of the housing 110 except for the opening of the bottomed hole 110a and its vicinity has an area with an angle (referred to as a central angle hereinafter) θ of 180° (degrees) or wider around the spherical center C. The central angle θ may be 270° or wider, or 300° or wider. The area having the central angle θ forms a continuous spherical surface SR that can entirely contact the vibrators 11 to 13. In other words, there is no discontinuous part such as a dividing line or a step of the housing 110 in the spherical surface SR having the central angle θ. The portion of the bottomed hole 110a opposite to the opening is also closed to form part of the spherical surface SR. The spherical surface SR can increase a rotational range (movable range) in which the movable unit 100 can be smoothly rotated by driving the vibrators 11 to 14.

The spherical surface SR having the continuous central angle θ may exist in one of a plurality of sections passing through the spherical center C in the housing 110.

As illustrated in FIG. 7C, the antenna 53 provided inside the image pickup unit 300 and configured to enable the movable unit wireless communicator 104 to perform the wireless communication with the outside of the movable unit 100 (support unit communicator 208) is located outside the area of the central angle θ (spherical surface SR) or in a range beyond both ends of the area of the central angle θ of the movable unit 100. In other words, the antenna 53 is located at a position protruding to the object side B from both ends of the area of the central angle θ in the movable unit 100.

This embodiment maintains wide the spherical surface SR made of metal on the outer surface of the movable unit 100 in order to increase the movable range of the movable unit 100. At this time, if the periphery of the antenna 53 is covered with the metal spherical surface SR, good wireless communications are unavailable. Hence, by arranging the antenna 53 as illustrated in FIG. 7C, even if the entire housing 110 or the spherical surface SR is made of metal, the antenna 53 does not overlap the spherical surface SR in the radial direction and consequently the good wireless communication with the outside is available.

In the image pickup unit 300, a set of the imaging flexible wiring board 51, the imaging control processing circuit and the imaging data memory 103 of the imager 102, and a set of the movable unit wireless communicator 104, the antenna 53, and the communication flexible wiring board 52 are arranged in areas opposite to each other with respect to the battery unit 105 (or the optical axis of the lens unit 101). This arrangement can separate from each other the imaging flexible wiring board 51 serving as the image pickup system signal path and the communication flexible wiring board 52 serving as the communication system signal path, and dispose the battery unit 105 between them. Thereby, the wireless communication is less affected by the noises generated in the image pickup system communication path.

The above embodiment can implement an image pickup apparatus having a wider movable range of the spherical movable unit so as to increase the image pickup range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-100462, filed on May 29, 2019, which is hereby incorporated by reference herein in its entirety.

What is claimed is:

1. An image pickup apparatus comprising:
a movable unit that includes an image pickup unit having a lens and an image sensor; and
a driver configured to drive the movable unit so as to change a direction of the movable unit,
wherein the driver is a vibrator whose vibration is excited by a piezoelectric element,
wherein at least part of an outer surface of the movable unit is a spherical surface, and the spherical surface includes a contact surface which the vibrator contacts, and
wherein the contact surface is continuously provided in at least one section passing through a spherical center of the spherical surface in an area of a central angle of 180° or wider around the spherical center on the spherical surface.

2. The image pickup apparatus according to claim 1, wherein the central angle is 270° or wider.

3. The image pickup apparatus according to claim 1, wherein the movable unit has a concave portion configured to detachably hold the image pickup unit.

4. The image pickup apparatus according to claim 3, wherein the concave portion has an opening for exposing the lens in the image pickup unit to outside of the movable unit, and
wherein part of the movable unit opposite to the opening is also part of the contact surface.

5. The image pickup apparatus according to claim 1, wherein the contact surface is made of metal.

6. The image pickup apparatus according to claim 1, wherein the image pickup unit includes an antenna and a communicator configured to perform a wireless communication with outside through the antenna, and
wherein the antenna is disposed in a range beyond both ends of the area of the central angle in the at least one section.

7. The image pickup apparatus according to claim 6, wherein the antenna is disposed at a position protruding to an object side of the both ends of the area of the central angle in the at least one section.

8. The image pickup apparatus according to claim 6, wherein the antenna, the communicator, and a communication system signal path for connecting the antenna and the communicator to each other, and an imaging data signal path in the image pickup unit are arranged in areas opposite to each other with respect to the optical axis of the image pickup unit.

* * * * *